United States Patent
Jadhav

(10) Patent No.: US 10,445,340 B2
(45) Date of Patent: Oct. 15, 2019

(54) USE OF COLLABORATIVE SERVER IN A CLOUD-BASED ENVIRONMENT

(71) Applicant: Ajay Jadhav, New York, NY (US)

(72) Inventor: Ajay Jadhav, New York, NY (US)

( * ) Notice: Subject to any disclaimer, the term of this patent is extended or adjusted under 35 U.S.C. 154(b) by 399 days.

(21) Appl. No.: 14/775,990

(22) PCT Filed: Mar. 14, 2014

(86) PCT No.: PCT/US2014/028230
§ 371 (c)(1),
(2) Date: Sep. 14, 2015

(87) PCT Pub. No.: WO2014/144005
PCT Pub. Date: Sep. 18, 2014

(65) Prior Publication Data
US 2016/0019278 A1 Jan. 21, 2016

Related U.S. Application Data

(60) Provisional application No. 61/790,825, filed on Mar. 15, 2013.

(51) Int. Cl.
| | | |
|---|---|---|
| G06F 17/30 | (2006.01) | |
| G06F 7/00 | (2006.01) | |
| G06F 16/27 | (2019.01) | |
| H04L 29/08 | (2006.01) | |
| G06Q 10/10 | (2012.01) | |

(52) U.S. Cl.
CPC ........... *G06F 16/27* (2019.01); *G06Q 10/101* (2013.01); *H04L 67/1095* (2013.01); *H04L 67/1097* (2013.01)

(58) Field of Classification Search
CPC ............ G06F 17/30575; G06Q 10/101; H04L 67/1095; H04L 67/1097
USPC ........................................................ 707/624
See application file for complete search history.

(56) References Cited

U.S. PATENT DOCUMENTS

| | | | |
|---|---|---|---|
| 7,072,911 B1 * | 7/2006 | Doman | G06F 17/30575 |
| | | | 707/615 |
| 8,407,190 B2 * | 3/2013 | Prahlad | G06F 3/0649 |
| | | | 707/692 |

(Continued)

FOREIGN PATENT DOCUMENTS

WO 2013/019913 A1 2/2013

OTHER PUBLICATIONS

International Search Report and Written Opinion, dated Aug. 21, 2014, in related International Application No. PCT/US2014/028230, filed Mar. 14, 2014.

(Continued)

*Primary Examiner* — Pavan Mamillapalli
(74) *Attorney, Agent, or Firm* — Wiley Rein LLP

(57) ABSTRACT

A system and method for increased ability to share and interact with data objects spread across a cloud in a collaborative environment. There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

8 Claims, 5 Drawing Sheets

(56) References Cited

U.S. PATENT DOCUMENTS

| | | | | |
|---|---|---|---|---|
| 8,566,397 | B2* | 10/2013 | Richards | G06F 9/541 |
| | | | | 709/204 |
| 8,819,536 | B1* | 8/2014 | Lucovsky | G06Q 10/10 |
| | | | | 715/205 |
| 8,849,955 | B2* | 9/2014 | Prahlad | G06F 3/0649 |
| | | | | 709/219 |
| 9,015,248 | B2* | 4/2015 | Barreto | G06F 15/16 |
| | | | | 709/205 |
| 9,213,581 | B2* | 12/2015 | Klemba | G06F 9/5072 |
| 9,535,924 | B2* | 1/2017 | Mackenzie | G06F 16/1767 |
| 9,652,741 | B2* | 5/2017 | Goldberg | G06F 16/178 |
| 9,813,496 | B2* | 11/2017 | Verma | H04L 67/1044 |
| 2003/0204517 | A1 | 10/2003 | Skinner et al. | |
| 2005/0278392 | A1* | 12/2005 | Hansen | G06F 17/30581 |
| | | | | 707/999.201 |
| 2008/0195454 | A1* | 8/2008 | Lee | G06Q 10/10 |
| | | | | 705/7.18 |
| 2010/0332818 | A1* | 12/2010 | Prahlad | G06F 17/30082 |
| | | | | 713/150 |
| 2011/0022812 | A1* | 1/2011 | van der Linden | G06F 9/5077 |
| | | | | 711/163 |
| 2013/0014023 | A1 | 1/2013 | Lee et al. | |
| 2013/0124638 | A1* | 5/2013 | Barreto | G06F 15/16 |
| | | | | 709/205 |
| 2013/0138608 | A1* | 5/2013 | Smith | G06F 16/27 |
| | | | | 707/610 |
| 2013/0268480 | A1* | 10/2013 | Dorman | G06F 16/1787 |
| | | | | 707/608 |
| 2013/0311598 | A1* | 11/2013 | Arrouye | G06Q 10/10 |
| | | | | 709/217 |
| 2015/0254897 | A1* | 9/2015 | Marder-Eppstein | |
| | | | | G06F 3/0484 |
| | | | | 345/419 |

OTHER PUBLICATIONS

International Preliminary Report on Patentability, dated Sep. 24, 2015, in related International Application No. PCT/US2014/028230, filed Mar. 14, 2014.

* cited by examiner

USE OF COLLABORATIVE SERVER IN A CLOUD-BASED ENVIRONMENT

RELATED APPLICATION

This application claims priority benefit from U.S. Application No. 61/790,825, filed Mar. 15, 2013, incorporated fully herein by this reference.

FIELD OF THE INVENTION

The invention relates to the use of a collaborative server in a cloud-based environment.

BACKGROUND

Currently, applications generally reside on a local device or machine. Access and data updates are saved to the local machine and then may be uploaded and/or backed-up on a dedicated, an in-house or a hosted server located elsewhere—such as iCloud or Dropbox. With the proliferation of the Cloud and mobile device use, applications are residing more and more on mobile devices while data is residing on remote servers with access granted to users through passwords, secure tokens, etc. In another setup, users are allowed to access the web-based application (web apps) through an Intranet and/or through the Internet with data changes being saved on a remote server; this, however, is done at the cost of increased latency and, in most cases, the inability to utilize the data residing on the server side when there is no Internet access.

SUMMARY

The foregoing needs are met, to a great extent, by the embodiments of this invention, wherein in one aspect Systems and methods are provided for increased ability to share and interact with data across the Cloud in a collaborative environment.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
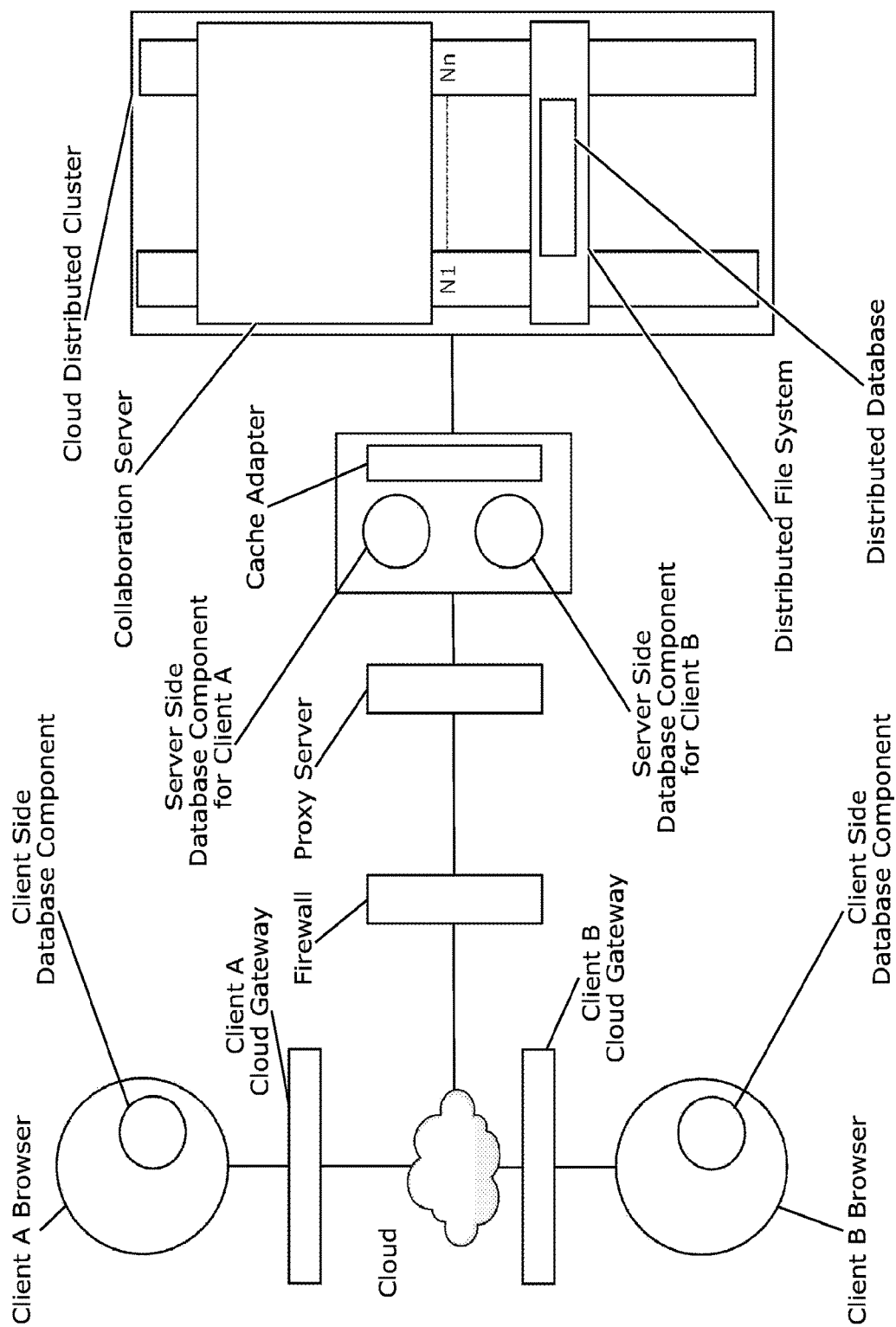
FIG. 1 is a diagram depicting the data flow from a device to the collaborative server in accordance with an embodiment of the invention.
Figure 2A:
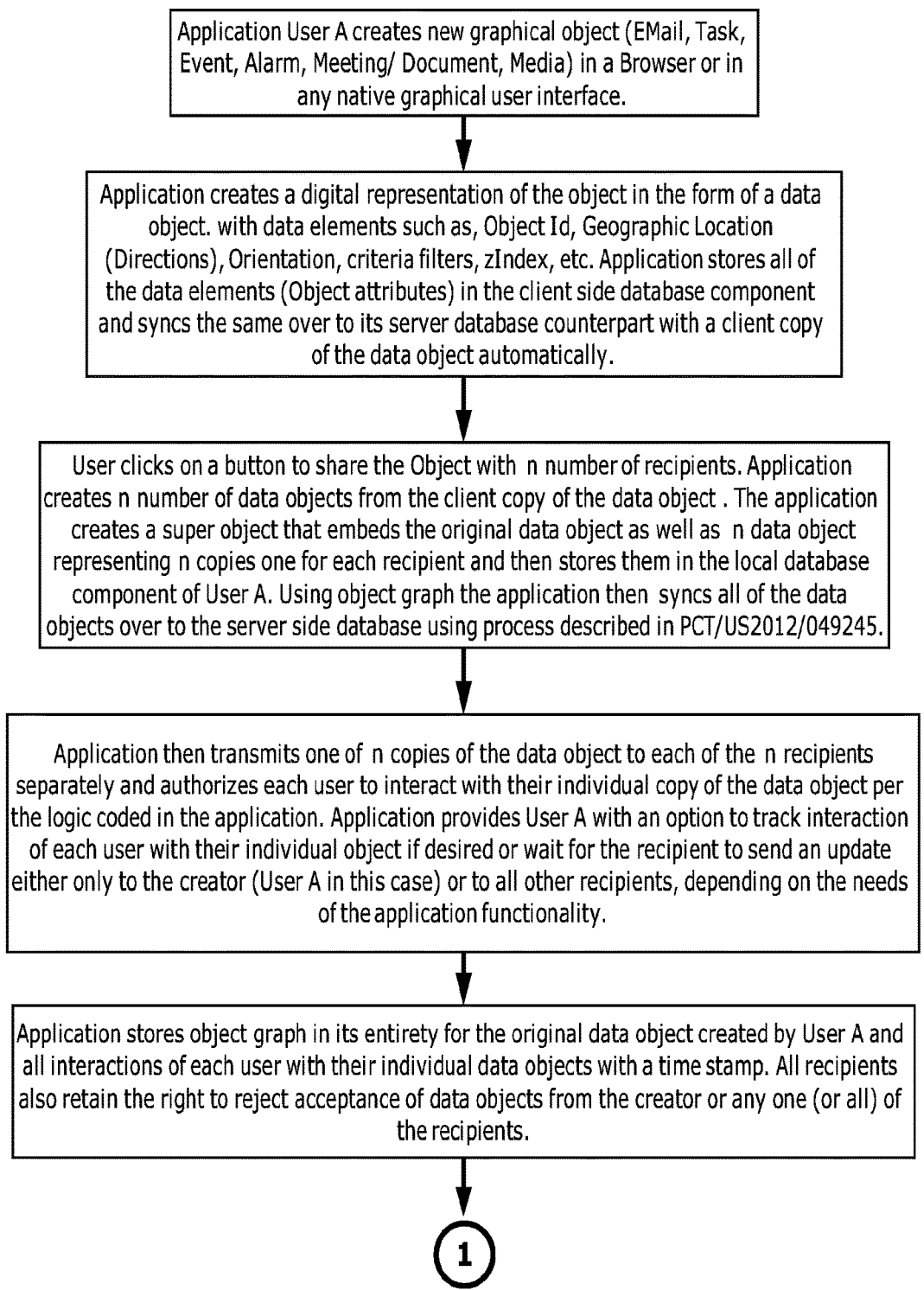
FIG. 2A and FIG. 2B shows a collaboration server object graph and persistence process in accordance with an embodiment of invention.
Figure 2B:
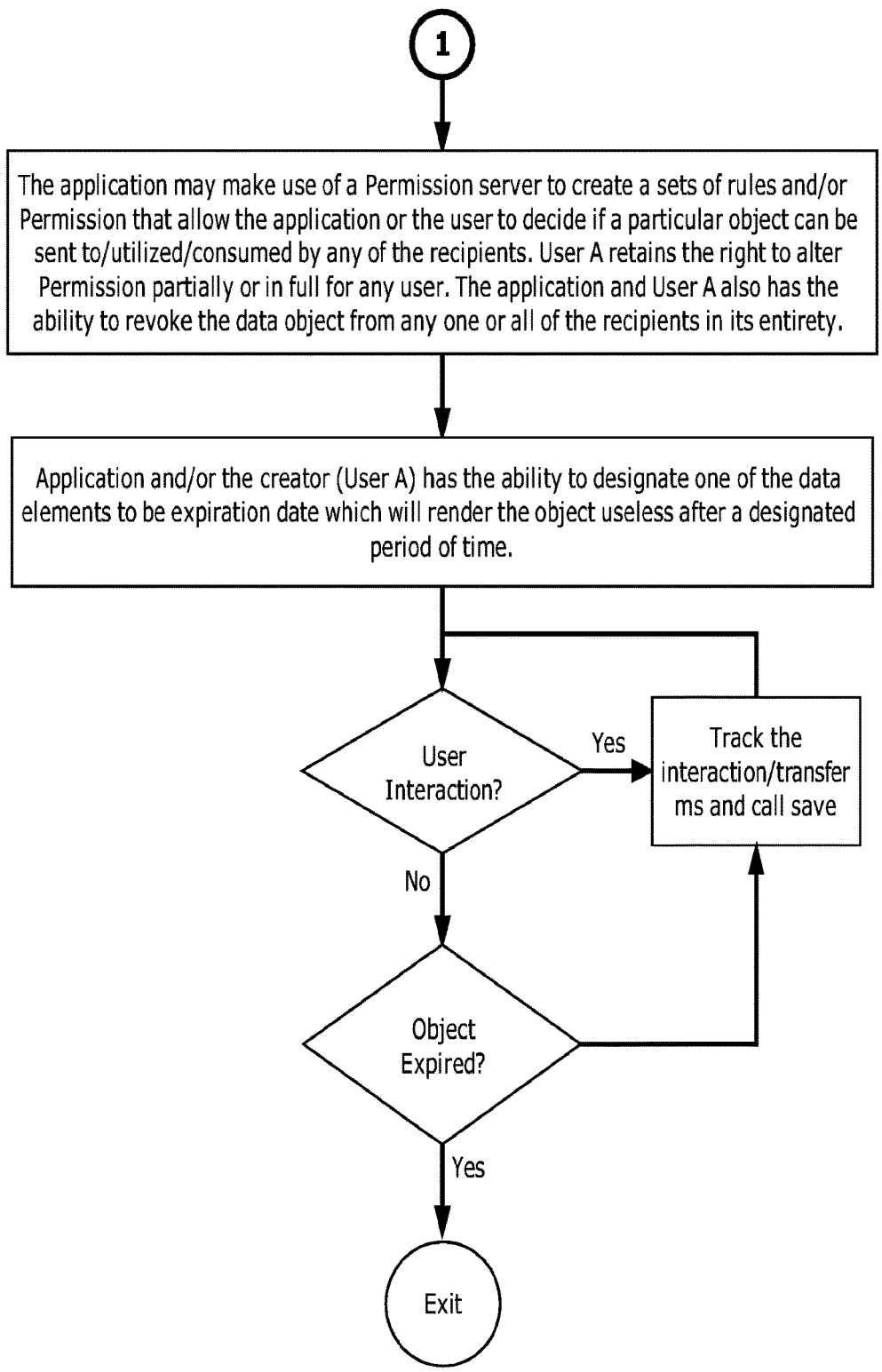
Figure 3A:
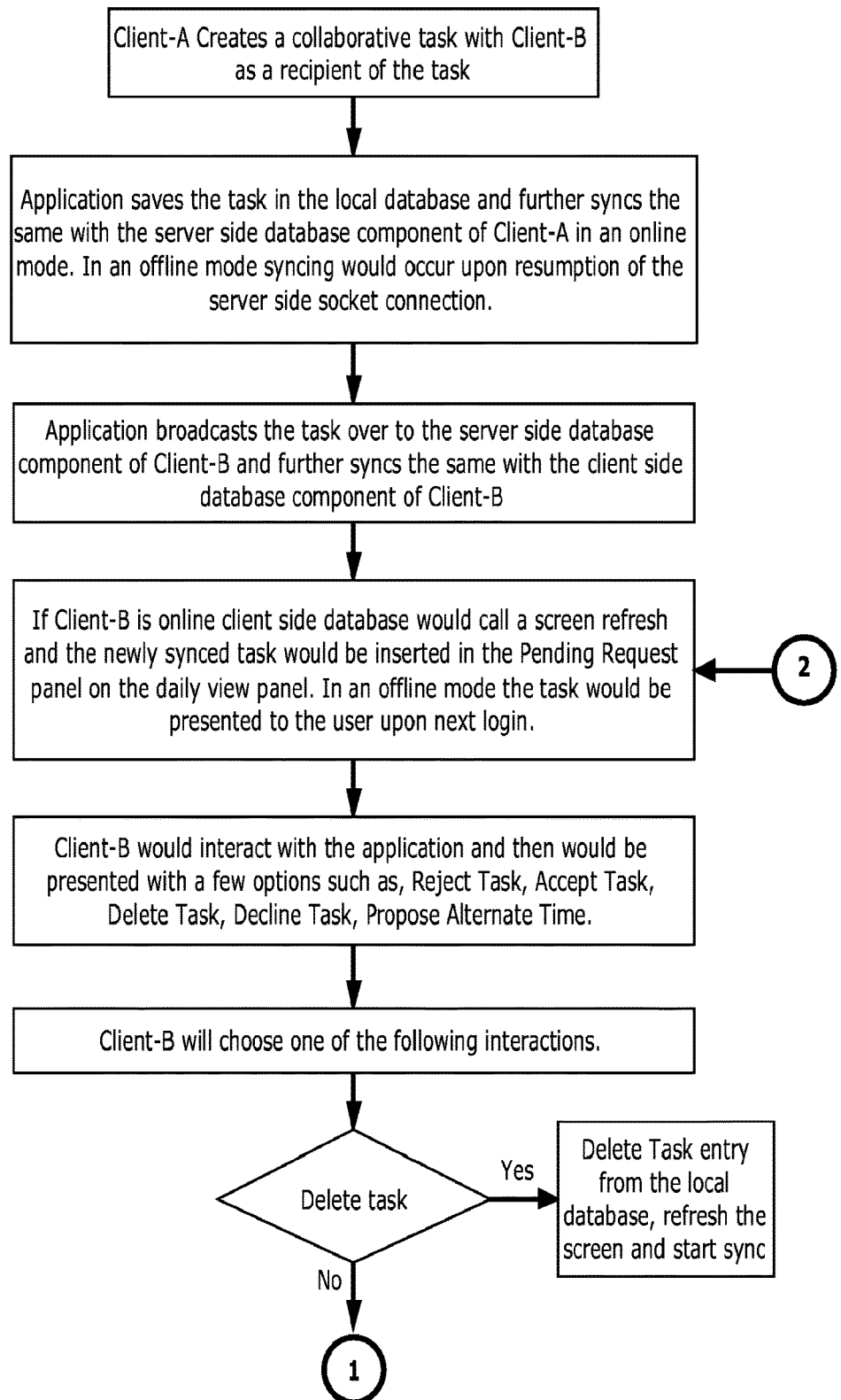
FIG. 3A and FIG. 3B shows a collaborative task flow in accordance with an embodiment of the invention.
Figure 3B:
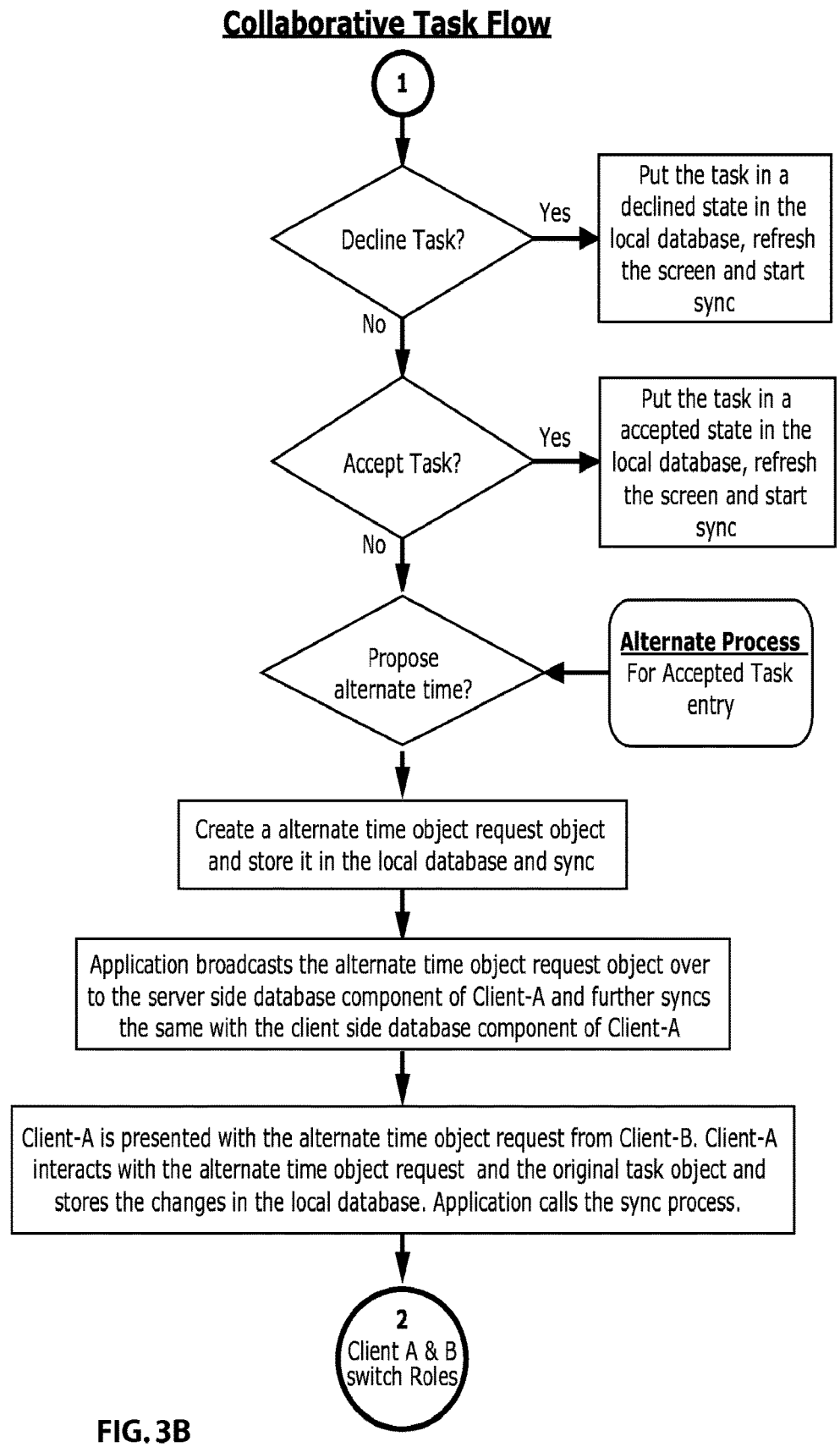

The embodiments of the invention will now be described with reference to the drawing figures, in which like reference numerals refer to like parts throughout. Embodiments of the invention advantageously provide systems and methods for increased ability to share and interact with data across the Cloud in a collaborative environment.

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

As used herein and in the claims, the singular forms include the plural reference and vice versa unless the context clearly indicates otherwise; the term "or" is inclusive unless modified, for example, by "either." Other than in the operating examples, or where otherwise indicated, all numbers expressing quantities of ingredients or reaction conditions used herein should be understood as modified in all instances by the term "about."

Unless otherwise defined, scientific and technical terms used in connection with the formulations described herein shall have the meanings that are commonly understood by those of ordinary skill in the art. The terminology used herein is for the purpose of describing particular embodiments only, and is not intended to limit the scope of the present invention, which is defined solely by the claims.

The present embodiments provide systems and methods for increased ability to share and interact with data objects spread across the Cloud in a collaborative environment by utilizing our proprietary database architecture described in U.S. patent application Ser. No. 13/565,171, filed Aug. 2, 2012. This includes objects residing locally and/or in the Cloud that are created, transmitted, received, modified and consumed by mobile devices, desktops and other computer input modes and devices. One embodiment of the solution proposes that the client creates a new object that is stored locally either in the browser, in a dedicated standalone native application or in a hybrid of the two on a local machine. The application then transmits, updates and maintains a copy of this data object on a user specific server-side counterpart of the local client database. The application further transmits this data object, from the client and/or the server side database component, to a secondary database called the "Cloud Collaborative Database ("CLOCDB") that contains the data for multiple users in a structured and/or unstructured format on a Cloud distributed file system. The application continuously transmits updated version/s of the data object to the databases on an event/change basis. An aspect of this architecture is that the data and some parts of the application reside on a remote server that perform the heavy computational tasks either directly in the Cloud distributed file system or in a structured or a structured relational database, and then transmit either the computed data or the original data back to the user specific server-side database component, which then in turn syncs up with the client-side component of the database.

In a non-collaborative mode, the creator of the data object has permission to interact with the data object only as described in the application logic. In the collaborative mode, the data object can be shared, transmitted or interacted with by any number of authorized recipients of the shared data object with security credentials being assigned by the creator of the object and applied by the application. This pertains to data objects such as, but not limited to, calendar related events, emails, audio/video tracks, books, or any entity that can be represented digitally and shared.

FIG. 1 is a diagram depicting the data flow from a device to the collaborative server. At first, the data object gets created on the client machine, but the actual data object that gets shared and interacted with resides on what is termed herein a "collaborative server." Each recipient of the shared object retains a local copy or replica of the original data object, and it resides in their own individual client cache components. These client copies are updated when data is interacted with, received or transmitted. The application creates a super object that embeds the original data object along with all of the replicas created by each user. This creates an object graph, which is nothing but a mesh of objects contained within each other pursuant to application logic. Each user is assigned a version of the data object and its updates if the application logic calls for it, but the synching occurs whenever any of the recipients update the data. Where there is no Internet connection, the updated data is stored in the local cache component and updated once a connection is established. Each user's individual data object is secured to represent his or her unique identity and entry.

The sync process of the object graph requires that upon calling the sync function of the super object, the application individually calls the sync function of each and every object embedded in the super object iteratively. This would be very cumbersome and unsustainable in a traditional relational database with multiple updates.

The difference between the present embodiments and what is currently being used on the market is that the present embodiments have added an additional layer of caching by placing a replica of the original data object and shared data objects on the client-side cache that requires only a small delta for all updates. It does not require any presentation logic to be shipped with each update to the recipient or the original creator. This provides a tremendous boost in performance, improved upload times and download speed, and a reduction of bandwidth pull both on the client and the server side.

Any user of the application can create a data object for self-consumption. The application stores a copy of the data object and then syncs it with the server-side component as described above. In a collaborative (sharing) mode, the user creates a data object and indicates that they wish to share the data object with one or more recipients. In this scenario, as a first step, everything occurs as described above; on the server side, however, CLOCDB makes and stores a separate copy of the original data object for every authorized recipient along with any other shared data objects. All interaction between each recipient and the creator of the object is captured by archiving the state of the data object prior to any and all updates associated with any interaction between the creator, the application, and the recipients.

The above is possible only because of this proprietary architecture that creates a separate data cell for each and every individual user on the server side in conjunction with a seamless sync to a distributed file system, and/or an unstructured database, or a structured relational database. The collaboration server coordinates multiple monitor locks, accounting for a separate lock to be associated with each recipient with whom the data object is shared.

Unlike previous embodiments referred to in U.S. patent application Ser. No. 13/565,171, filed Aug. 2, 2012, which centered around utilizing a local cache with a synced server-side component in a Cloud-base environment for the creation and interaction of individual user data and the aggregation of data for multiple users, this solution involves creating individual or shared data objects that are equally accessible across a number of users and devices in the Cloud. As stated above, the application creates single or multiple copies of the shared data object for each individual recipient that desires to interact with the original data object; it keeps track of all of the user interactions; and it syncs the changes/updates to the original object if so desired while maintaining a persistent copy of various object states throughout the data's life cycle as the object morphs from one state to another. Each data object can have a customizable life cycle period based on varied user interaction.

The collaborative part of the application resides on a server located in the Cloud. The ability for multiple users to access and interact with various data objects is different in this configuration as compared to traditional application infrastructures and to current Cloud-based architectures, in that one is not tied to a single data model or a rigid object type—be it a relational database or an unstructured NoSQL database. To this effect, the application provides for data objects that, in one aspect, act as an abstract carrier with the data payload as one of the data elements of the object. The original data object has the ability to morph into a completely different object type by switching these payloads or embedding a new data object with a different type of payload.

In fact, in the present embodiments, there exists a single data cell for every user in the system, the process of which is described in more detail in U.S. patent application Ser. No. 13/565,171, filed Aug. 2, 2012. The present collaborative server model consolidates these single user data cells in a distributed Cloud environment. As described in U.S. patent application Ser. No. 13/565,171, the individual data cells are persistent by themselves, whereas, the objects in a collaborative server are transient in nature with various objects states being persisted throughout their individual life cycle. Further, some of these objects could be tied to each other by relationships established by the application at the time of creation or at some later time. All of the heavy lifting required by object graph persistence and monitor locks is performed by the collaboration server, with minimal or very little work performed on the client side. By doing so, the embodiments provide the advantages of power, capacity and speed to all mobile and non-mobile clients with little or no computing power of their own—as all of the heavy lifting is done on the collaborative server side in the Cloud.

Sharing privileges are retained by giving each user a unique ID and then assigning ownership for the newly created data objects to said ID. The unique ID is converted into a unique identifier as a security token using various security routines, including, but not limited to, encryption, which allows for hiding of the real identity of the creator. Using this security token, the application can set elaborate security policies related to the sharing of data objects in the collaborative server and can setup various authentication checks along the path of the data object transmission.

The data object creator retains a cached version on a user's local device that is updated and synced to the server-side counterpart from time to time as the creator shares and then allows other authorized users to interact with and update the replicated data objects. These updates or over-rides by other authorized users are captured and persisted by the collaborative server as part of data object's lifecycle. The present application retains the ability to restore the object to any of its previous states should the user desire to do so. The CLOCDB is a shared space where items contained on it can be anything from audio, video, images, email, books, magazines, physical items in a digitized form, shopping carts, utility bills, bank statements, a complete database, or any imaginable entity that can be represented in a digital data format.

Upon the completion of the creation process of the data object by either a user of the application or the application itself in the case of a system generated event, the data object becomes sharable and the creator and/or the application can either publish and/or transmit the data object or its reference to a single user or to a desired list of several users. The publishing of the data object can occur via an industry standard publish/subscribe mechanism or through a proprietary publish/subscribe mechanism. The collaborative server then creates and/or replicates a copy of the data object for each individual recipient of the data object. All recipients can interact with the object either concurrently or individually through a set order. Once one or more users updates the data, the new information is pushed out to either only the creator or to all the other shared users based on various scenarios. This is done via the proposed architecture wherein copies are created and/or updated by using an object graph as described above as the new data objects are created or as the existing information is being updated.

Recipients can choose to accept a shared object, reject it outright or designate it to be in a pending state wherein they can make a decision at a later time. Recipients can further indicate if they would like to send a receipt of their interaction with the received data object—embodiments allow recipients to acknowledge any or all actions to the creator of the data object.

All interactions, including authentication and validations with the data object, are defined by the creator (the application can also act as a creator). The creator of the data object is free to create and set any rules that they desire; they can indicate that newly created data objects are for pure consumption, or that the objects can be or cannot be interacted with or responded to under certain situations. The application maintains a time-stamped log of all transformations/interactions/mutations by using an object graph as described above, for the original data object, as well as, for the objects sent over to recipients, which includes any newly created objects.

Based on user interaction with any data object, the application has the ability to create new independent data objects or related objects that are peers or hierarchical children of the original data object as desired or designated by the application logic. These objects can work independently or can be embedded within the original objects as it best suits the needs of the application. There are no boundaries to the levels of hierarchy, thereby allowing the system to create, share and collaborate on embedded objects. Any and all data objects within the system are embeddable amongst each other. Any data object can contain single or multiple types of data objects that are of similar and/or completely different types from one another. As described in PCT US2014/027584, the unique node based framework allows for the type of an individual embedded object to have the ability to invoke a particular piece of functionality based on application logic and user or system action. Any given data object can have a self-timer that upon the expiration of the set interval, has the ability to invoke the functionality associated with one or more data elements based on the application logic. The embedded function data element that invokes application logic or functionality allows for the application code logic to be retrieved without requiring transportation of massive amounts data to the code destination, as is done in a traditional web based application server environment. The present application, in fact, does exactly the reverse; it invokes the application logic associated with the data object as described by the data element within the data object—on demand from where the data resides.

The data objects in this application, in addition to the traditional data elements, also contain one or more data elements that encompass one or more function calls, termed as functional data elements. These function calls refer to code logic that the application can invoke from anywhere without having to be transported to the location of the code, as is done in traditional systems. This functionality is applicable only in a network-distributed system wherein an object with a function call data element is transported over long distance via the network, both Internet and Intranet. This function call data element along with the data itself is persisted in the local database, which is then synced up with its counterpart on the server side and then further synced up with the distributed file system and/or a traditional structured relational or a nonrelational unstructured distributed database. In a traditional application setup, if a client were to interact with the data object, the data needs to be transported over the network to where the code resides and then the application would interact with it. This requires a tremendous amount of bandwidth and latency and is unsustainable in the world of mobile computing. The ability of the present approach to embed function calls within an object and to sync this object bi-directionally between the client and the server, in addition to the ability to seamlessly invoke application logic on either the client or the server side using functional data elements of the data objects, allows our application to transport only minimal amounts of data for presentation logic, which is ideal for mobile computing. The two dominant platforms in the mobile world today, iOS and Android, require that an application (App) be installed in advance of any data processing. The approach outlined above allows the client to dynamically load applications and process data objects in addition to being able to invoke functionality embedded in the functional data elements without any preloading.

The application provides a seamless mechanism for the persistence and the retrieval of embedded objects by using either a standard non-proprietary persistence mechanism and/or a proprietary object graph mechanism. The mechanism makes use of object graph persistence for every state of change in the data object (and/or its embedded objects) throughout its lifecycle as the user or the application interacts with the data object. The object graph persistence related functional elements make use of our proprietary database infrastructure as described in U.S. patent application Ser. No. 13/565,171.

The present application has the ability to transact on any and all data objects created within the application, as well as, any and all external data objects accepted by the application. These transactions can be of any type—system or application related internal transactions in a web/Cloud based transaction system or an external transaction, such as, a financial services related transaction (buying a stock), the issuing of a ticket for an event or for transportation, the creation of an event/meeting in a calendar, or an e-commerce transaction.

The back-and-forth interaction between the creator and one or more of the recipient data objects can continue without limitation to time and/or scale. The data objects have the ability to allow the recipients and their data objects to be attached to the original data object either through an event based mechanism or through a publish and subscribe mechanism. This allows for a mass update of data objects to be transmitted to one and more recipients based upon some selection criteria. Recipients always possess the ability to reject, accept or ignore the updates if they have accepted the original transmission. The application also allows for the transmission of updated data objects to the recipients regardless of whether they have accepted/rejected/declined/ignored the original transmission.

The logic described above, with the ability to (not necessarily in this order): (1) create data objects along with the ability to attach a permission based mechanism to the data object it is sharing; (2) apply security routines to data objects that encompass encrypting and decrypting of any and all data elements of a data object; (3) allow through the collaborative server for separate channels of communication with each and every recipient of the shared data object with transactional historical logs; (4) publish and subscribe mechanisms for data broadcast to all or selected users; (5) embed objects of similar or different kinds within each other; (6) ship application logic to the data location using functional elements as opposed to transporting small and/or massive amounts of data to the application code logic location; and (7) ship data objects to clients without the presentation logic. These features provide a unique mechanism to bring efficiencies to all facades of Cloud centric processing.

The functionality described above has massive implications in terms of improving the efficiency of data processing and reducing bandwidth for processing massive amounts of data. This application can transmit data objects of minuscule size to clients with zero or no presentation logic whatsoever. The client side application framework described in provisional United State patent application number PCT US2013/059160 allows for application logic/functionality to be invoked on the client side based on the data object type and the functional data element.

The example below leverages the unique functionality of a Cloud distributed database mechanism as described in U.S. patent application Ser. No. 13/565,171, together with the functionality of the collaborative server. It is a common practice in today's industry to embed one data object within another to create an object graph. This practice allows an application to embed an email object acting as an embedded object in its entirety, within a meeting invite object acting as a container or vice-versa. The Cloud distributed database infrastructure, described in U.S. patent application Ser. No. 13/565,171, allows the application to transport the whole object graph in its entirety with zero or minimal application logic. In this example, upon the creation of the invite (the container) object and the email (the embedded) data object, the application can share and transmit the "combined" object over to other recipients, through the collaborative server where the recipients can respond, reject, ignore or modify any part of the transmission. Transporting and being able to persist the whole object graph from the collaborative server to the client in its entirety enables the application client to interact with each individual object and its corresponding data elements independently, thereby rendering the invite as an invitation to be programmed into your calendar or to be responded to via email to another calendar program through an embedded object, which then responds to the sender and/or all recipients via email. This would occur on a real-time basis with no need to open or switch to another application.

Another example of this unique use would be sending an email that contains an audio track, a photo album and a thank you card as one object and not as separate attachments requiring separate programs to render them. Another example would be an invitation to a camping trip with an embedded object that contains a supply list linked to an online store—the list would be rendered within the one screen and would allow for one click delivery within the single application.

Another example would be to use the solution in a collaborative calendar setting. Several users can share one calendar wherein information is color coded and updated on a real-time basis. Each user retains a copy or replica of the calendar on her individual device. If she were to change or alter any data, such as by adding an appointment or updating a meeting, this information would be transferred to the collaborative server located on the Cloud. The collaborative server would then update the information on the master calendar and then send out the new replica calendars to anyone that has subscribed and has been given privileges to the master calendar.

In a calendar setting, the application creates a data object called a day object, which corresponds to one day in the calendar. In essence, the application treats the calendar as a collection of these day objects. A user of the application or the application itself can create and publish multiple day objects to create calendars with daily, weekly, monthly, quarterly or yearly views in perpetuity. The presentation logic described in PCT US2013/027584 provides a clutter-free and organized calendar view.

This concept of day objects also allows for a user to create a single day object or a collection of day objects, which are not attached to any specific date in any given calendar. At a later time, if desired, this set collection can be overlaid on top of a traditional calendar with a specific start and end date; this collection pattern can be repeated over a period of time. The application treats the calendar as one super object with all of the days representing embedded objects by making use of a proprietary object graph structure—the whole calendar object graph is stored using the persistence mechanism described in U.S. patent application Ser. No. 13/565,171.

Any authorized user, including the creator, or the application itself has the ability to create one or more data objects representing transactional entities and embed them into these day objects. These data objects can be digital representations of any and all entities, such as, events in a day, media objects, documents, etc. The application designates these objects as transactional objects. As described previously, data objects can invoke a specific type of transactional functionality that conforms to the combination of the data object types by using functional data elements. The application would then allow the creator or the application to publish the whole calendar along with its embedded objects upon completion on any website in any form—such as an embedded calendar, a stand-alone calendar, etc. The application assigns a ready to publish status to the whole calendar object. The application again makes use of the proprietary object graph structure to store the whole calendar object graph along with the embedded objects in a persistent manner as described in U.S. patent application Ser. No. 13/565,171.

The calendar's creator sets subscription and transaction rules for the entire calendar and/or any of its embedded objects. There is no limit to the number of subscribers to any calendar. The creator and the application retain the ability to revoke any subscription. The embedded objects or the calendar as a whole can be designated to be a transactional data object for e-commerce.

A subscriber to the calendar can interact with the calendar or its embedded objects as prescribed by the application logic. Users can simply subscribe to the calendar and its one or more embedded objects and/or transact with the calendar and its embedded objects. Utilizing the aforementioned collaboration server environment, the application can track and store any and all interactions by the creator/publisher or subscribers using the object graph and persistence mechanisms described in U.S. patent application Ser. No. 13/565, 171—this information is maintained by our proprietary transaction tracking and analytics server.

A unique calendar function created by our solution is the ability for users to create multiple levels of filtering based on specific criteria, such as priority, location, hierarchy, date, group, etc. Our application creates an object graph for these criteria, calling them buckets. Using a routing mechanism, the application automatically routes incoming data objects to designated buckets based on preset rules. The application provides users with the ability to create, modify and delete all routing rules—rules that can be overridden at any time. By utilizing this concept of buckets, a user can create calendars within other calendars—create a sub-calendar in a calendar. Combining these rules with the presentation logic, described in PCT US2013/027584, creates a unique and clutter-free experience.

The embodiments of the present invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

The embodiments of invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the invention may be web-based. For example, a server may operate a web application to allow the invention to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™ Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A system for increasing ability to share and interact with data objects spread across a cloud in a collaborative environment, comprising:
   a client browser executable by a user;
   a client-side database connected to the client browser;
   a server-side database connected to the client side database;

a cloud collaborative database connected to the server side database; and an application implemented in a computing device;

wherein the client browser is configured to create an original data object in the client side data base;

wherein the client-side database is configured to retain a local copy of the original data objects and a shared data object from other users;

wherein the data object contains one or more data elements persisting in the client-side data base;

wherein the application is configured to ship an application logic to the location of the data object through the data element as opposed to transporting the data object to the location of the application logic;

wherein the application is configured to create, transmit, update and maintain the data object from the client side database to the server side database and the cloud collaborative database;

wherein the application is configured to continuously and bi-directionally transmit updated versions of the data object among the client-side database, server-side database and the cloud collaborative database on an event/change basis;

wherein the application is configured to create a super data object that embeds the original data object along with all of the replicas created by each user;

wherein the server-side database is configured to create or replicate a copy of the data object for each user;

wherein the server-side database is configured to create a separate data cell for each user in conjunction with a seamless sync to the cloud collaborative database;

wherein the cloud collaborative database is configured to store the original data object, the shared data object, the super data object and a collaborative part of the application; and wherein the cloud collaborative database is configured to perform heavy computational tasks and transmit a new computed data object or the original data object back to the server-side database and the client-side database.

2. The system of claim 1, wherein the data object is configured to morph into a different object type by switching the data element or embedding a new data object with a different type of data element.

3. The system of claim 1, wherein a sync process occurs whenever a user updates the data object, and the application individually calls the sync function data element of each data object embedded in the super object iteratively.

4. The system of claim 1, wherein all interactions between each user of the data object are captured by archiving the state of data object prior to any update associated with any interaction between each user and the application.

5. A method for increasing ability to share and interact with data objects spread across a cloud in a collaborative environment in a system comprising a client browser executable by a user, a client-side database connected to the client browser, a server-side database connected to the client side database, a cloud collaborative database connected to the server side database, and an application, the method comprising:

creating the data object containing one or more data elements persisting in the client-side data base via the client browser or the application;

transmitting, updating and maintaining the data object from the client side database to the server side database and the cloud collaborative database via the application;

creating a super data object by embedding the original data object along with all of the replicas created by each user via the application;

shipping an application logic to the location of the data object through the data element as opposed to transporting the data object to the location of the application logic; and performing heavy computational tasks in the cloud collaborative database and transmitting a new computed data object or the original data object back to the server-side database and the client-side database;

wherein the client-side database is configured to retain a local copy of the original data objects and a shared data object from other users;

wherein the application is configured to continuously and bi-directionally transmit updated versions of the data object among the client-side database, the server-side database and the cloud collaborative database on an event/change basis;

wherein the server-side database is configured to create or replicate a copy of the data object for each user;

wherein the server-side database is configured to create a separate data cell for each user in conjunction with a seamless sync to the cloud collaborative database; and wherein the cloud collaborative database is configured to store the original data object, the shared data object, the super data object and a collaborative part of the application.

6. The method of claim 5, wherein the data object is configured to morph into a different object type by switching the data element or embedding a new data object with a different type of data element.

7. The method of claim 5, wherein a sync process occurs whenever a user updates the data object, and the application individually calls the sync function data element of each data object embedded in the super object iteratively.

8. The method of claim 5, wherein all interactions between each user of the data object are captured by archiving the state of data object prior to any update associated with any interaction between each user and the application.

* * * * *